(12) United States Patent
Bleumer

(10) Patent No.: US 7,610,247 B2
(45) Date of Patent: Oct. 27, 2009

(54) METHOD AND ARRANGEMENT FOR VARIABLY GENERATING CRYPTOGRAPHIC SECURITIES IN A HOST DEVICE

(75) Inventor: Gerrit Bleumer, Schildow (DE)

(73) Assignee: Francotyp-Postalia AG & Co. KG (DE)

( * ) Notice: Subject to any disclaimer, the term of this patent is extended or adjusted under 35 U.S.C. 154(b) by 947 days.

(21) Appl. No.: 10/690,012

(22) Filed: Oct. 21, 2003

(65) Prior Publication Data

US 2004/0117314 A1    Jun. 17, 2004

(30) Foreign Application Priority Data

Dec. 16, 2002   (DE)   ................. 102 60 406

(51) Int. Cl.
*G06Q 99/00*   (2006.01)
(52) U.S. Cl. .................... 705/60; 705/63; 705/401
(58) Field of Classification Search .................... 706/60
See application file for complete search history.

(56) References Cited

U.S. PATENT DOCUMENTS

| | | | | |
|---|---|---|---|---|
| 5,341,427 A * | 8/1994 | Hardy et al. ................. 380/273 |
| 5,742,684 A | 4/1998 | Labaton et al. |
| 5,805,711 A * | 9/1998 | Windel et al. .................. 380/55 |
| 5,812,990 A * | 9/1998 | Ryan et al. ................... 705/403 |
| 5,815,577 A * | 9/1998 | Clark ........................... 380/52 |
| 5,953,426 A | 9/1999 | Windel et al. |
| 6,009,417 A * | 12/1999 | Brookner et al. ............. 705/410 |
| 6,041,704 A * | 3/2000 | Pauschinger ................. 101/91 |
| 6,044,350 A | 3/2000 | Weiant, Jr. et al. |
| 6,058,384 A | 5/2000 | Pierce et al. |
| 6,169,804 B1 * | 1/2001 | Ryan et al. ..................... 380/51 |
| 6,240,183 B1 * | 5/2001 | Marchant ...................... 380/28 |
| 6,438,530 B1 * | 8/2002 | Heiden et al. ................ 705/401 |
| 6,636,970 B2 * | 10/2003 | Akiyama et al. ............ 713/189 |
| 6,850,912 B2 * | 2/2005 | Bleumer ...................... 705/51 |
| 7,222,238 B2 * | 5/2007 | Bleumer et al. ............. 713/177 |
| 2002/0035547 A1 * | 3/2002 | Bleumer ...................... 705/62 |
| 2002/0108042 A1 | 8/2002 | Oka et al. |

FOREIGN PATENT DOCUMENTS

DE   201 12 350   2/2002

OTHER PUBLICATIONS

Keytool—Key and Certificate Management Tool [online]. Sun Microsystems, Inc, 2001 [retreived on Jul. 17, 2008]. Retrieved from the Internet: <URL: http://java.sun.com/j2se/1.3/docs/tooldocs/win32/keytool.html>.*

* cited by examiner

*Primary Examiner*—Jalatee Worjloh
*Assistant Examiner*—Jamie Kucab
(74) *Attorney, Agent, or Firm*—Schiff Hardin LLP

(57) ABSTRACT

In a method and arrangement for variable generation of cryptographic securities of communications in a host device, for cryptographic security of a communication for a first purpose a first signature is used and for cryptographic security of a communication for a second purpose a second signature is used, the signatures being differentiated from each other by the type of their generation. A cryptologic module has a number of logic circuits and a changeover switch and is arranged externally of the postal security device and is connected at its output with an information input of the postal security device that has a logic circuit that applies a digital signal algorithm to the output signal supplied by the output in order to generate a signature.

4 Claims, 5 Drawing Sheets

METHOD AND ARRANGEMENT FOR VARIABLY GENERATING CRYPTOGRAPHIC SECURITIES IN A HOST DEVICE

BACKGROUND OF THE INVENTION

1. Field of the Invention

The present invention concerns a method and an arrangement for variable generation of cryptographic securities, such as for protecting communications, in a host device, of a type suitable for mail processing and having a security module such as franking machines, addressing machines, and similar devices.

2. Description of the Prior Art

A franking imprint contains an indicia representing previously entered and stored postal information, including the mailing fee data to deliver the letter. Modern franking machines enable printing of a special marking in addition to the aforementioned notice. For example, a Communication Authentication Code is generated from the aforementioned indicia and then forms a barcode as a marking. When a security imprint is printed with such a marking, it enables a verification of the validity of the security of the security imprint, for example in the post office (U.S. Pat. No. 5,953,426).

The franking machine JetMail® manufactured by Francotyp-Postalia AG & Co. KG, is equipped with a base and with a detachable meter. The latter contains a security module that, for example, generates a digital signature for a security printing by the franking machine (U.S. Pat. No. 6,041,704).

Furthermore, it is known to cryptographically secure the data exchange between a franking machine and a remote data central when a credit value is downloaded. A security module for this purpose can include a hardware accounting unit and a unit to secure the printing of the postal fee data (European Application 789 333). The hardware accounting unit is realized with an ASIC, and the other unit is realized with an OTP (One Time Programmable processor). The accounting event thus cannot be manipulated by means of a program attenuation, and moreover an arbitrary cryptographic algorithm can be stored in the read-only memory for the OTP processor such that it can be called. An internal OTP storage (memory) stores readable but protected data (among other things, cryptographic keys) that, for example, are necessary to download a credit or to generate a cryptographic security of a communication of the franking machine. A known encoding algorithm, for example Data Encryption Standard (DES), thus can be used for the formation of MAC's for communications of different types, whereby for each type a predetermined cryptographic key is agreed on (stipulated). A security housing of the security module provides external protection against disclosure of the cryptographic keys. (German Utility Model 201 12 350). Franking machines are developed for the most part only for a single purpose, namely to print postal indicia. Expensive encryption technology is thereby used. If further application possibilities for such devices were able to be developed wherein the accepted signal algorithms could be used without a danger of confusion with the postal indicia, this would expand the functionality of the device.

U.S. Pat. No. 6,058,384 generating a signature for a refund indicium, wherein an invalid ZIP code is used, for example 00000-0000. This should prevent a tamperer from fraudulently using the signature as an ordinary printed postmark to send mail.

Alternatives to assemble data for processing with the cryptographic algorithms in a specific manner dependent on the communication type, or in which the communication format is selected differently for a download indicia than for the communication format of an ordinary indicia, for example completely without ZIP, etc., are not always implementable due to the very different regulations of the national postal authorities or private postal carriers.

SUMMARY OF THE INVENTION

An object of the present invention is to provide a method and an arrangement for variable generation of cryptographic securities for communications in a host device, wherein the varying generation is controlled dependent on the communication type that has been set.

The object is achieved in accordance with the invention in a method and arrangement wherein different signatures are used for cryptographically securing a communications that are used for different purposes. The different cryptographic algorithms to generate signatures differing in type can be implemented separately or together in a logic module by hardware or by a program in the read-only memory of a postal security device (PSD).

Based on the recognition that the storage of different programs in the aforementioned read-only memory (each program serving to implement a specific cryptographic algorithm) enables an arbitrary combination of signing algorithms and hash algorithms for a communication type, a logic module is additionally connected to a postal security device. The logic module, alone or in conjunction with programs in the read-only memory of the postal security device and, if necessary, additionally with programs in the read-only memory of the host device, implements at least one specific algorithm from the multiple cryptographic algorithms, the implementation being controlled dependent on the communication type that has been set. The cryptologic module has at least one output that is directly or indirectly circuited to the input of a second logic circuit inside the postal security device. The cryptalgorithms can be implemented outside of the PSD in the cryptologic module and/or inside the PSD. By switching over, the inputs or outputs of logic circuits or parameters of hash functions can be switched by a logic circuit, the logic circuits using identical and differently assembled cryptoalgorithms. A changeover switch can be implemented in the PSD and/or outside of the PSD, and thereby be triggered by the PSD or host. The generation of a signature should be determined less by the host application and more the PSD application. Even more suitable are variants in which the changeover switch is realized in the PSD. Should the host application be determinative, variants are preferable in which the changeover switch is realized outside of the PSD. A number of variants of the structure implemented inside the cryptologic module and inside the PSD, and the interconnection of both under normal operating conditions are available, such that signatures can be generated that are invalid for the franking of mail but are suitable or valid for other purposes. Further application possibilities in the field of mail processing are special indicia such as, for example, postage correction indicia or military or embassy mail. Moreover, there are non-postal applications in the field of ticketing and monetary documents for which accepted signing algorithms now can be used in accordance with the invention, without a danger of confusion with postal indicia. This permits further application possibilities to be developed, which expands the functionality of franking machines.

DESCRIPTION OF THE PREFERRED EMBODIMENTS

Figure 1:
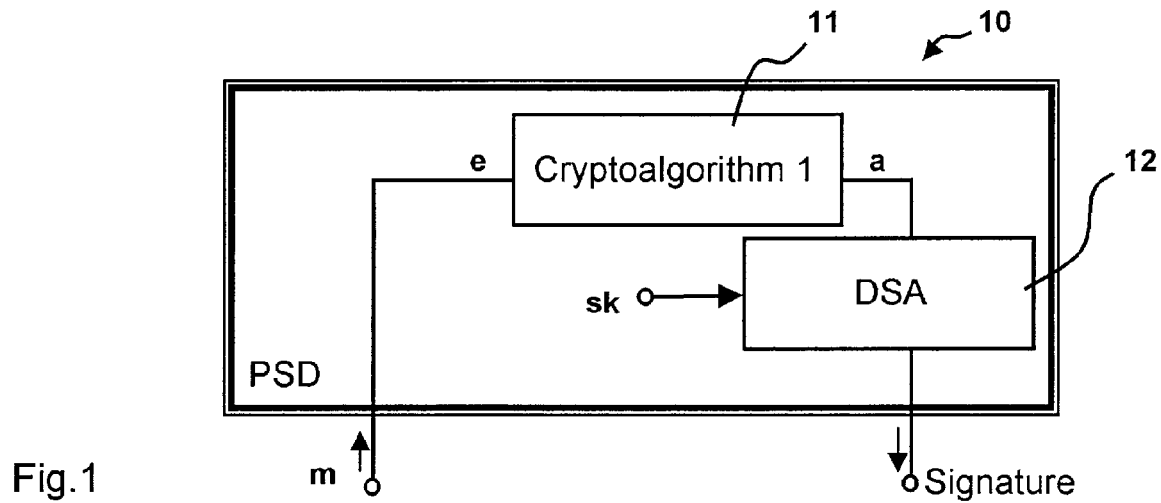
FIG. 1 is simplified depiction of the generation of a signature by means of a known postal security device (prior art).

FIG. 1 shows a simplified depiction of the generation of a signature by means of a known postal security device (PSD). Via an input e of the PSD 10, a communication m is applied to a first logic circuit 11 that applies a first cryptoalgorithm to the communication m. The output a of the first logic circuit 11 is connected to the input of a second logic circuit 12 that applies a digital signal algorithm (DSA) to the output signal in order to generate data for a signature. The logic circuits can be a software or hardware module that implements the corresponding algorithm according to software or hardware. For example, the digital signal algorithm (DSA) known from U.S. Pat. No. 5,231,668, or a comparable standard algorithm, is implemented according to software by the second logic circuit. A corresponding program that can be processed by a microprocessor (not shown) is implemented in the read-only memory (not shown) of the second logic circuit of the security module. In contrast to such known techniques, the first cryptoalgorithm is inventively implemented according to hardware and externally of the PSD 10 by means of the first logic circuit. In a first version, the first logic circuit is realized such that it can be connected to the PSD. In order to generate signatures for different purposes, an arrangement is achieved that uses two different permissible hash functions in the same signing algorithms.

Figure 2:
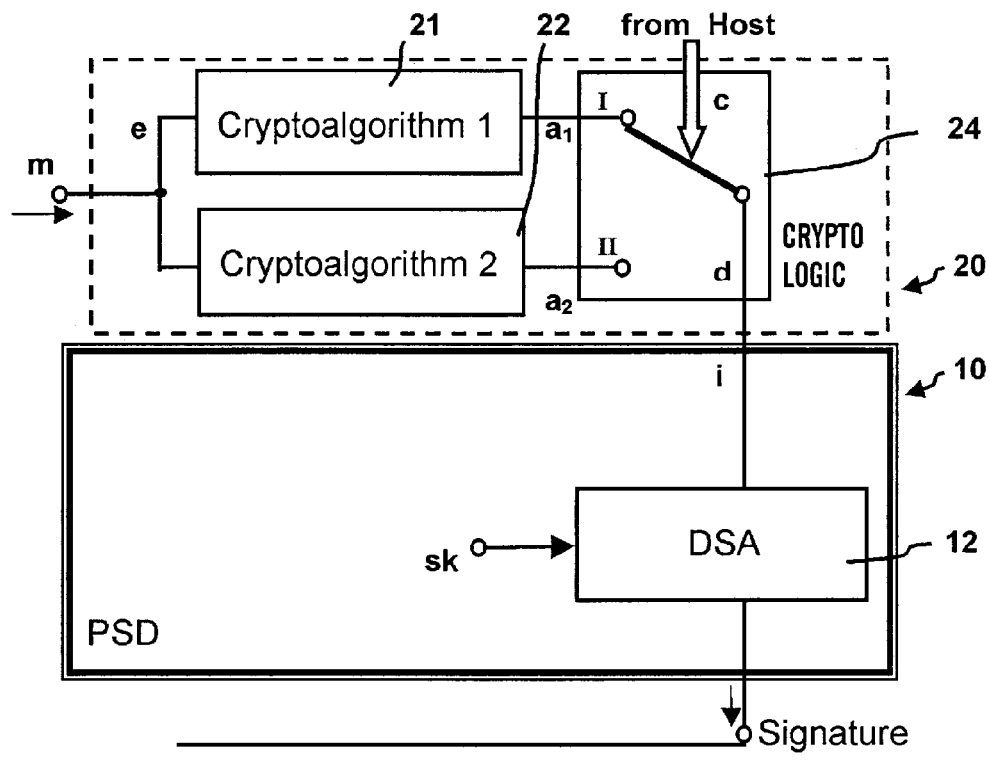
FIG. 2 shows a host-controlled switch for the cryptoalgorithms for generation of a signature by means of the postal security device, according to a first version of the invention.

FIG. 2 shows a host-controlled switch of the cryptoalgorithms for generation of a signature by a postal security device. In this first version, the logic circuit 21 for the cryptoalgorithm 1 and the logic circuit 22 for the cryptoalgorithm 2 are connected at their inputs and respectively lead at their outputs to contacts I and II of a changeover switch 24. The switch 24 is connected at its output to the input of the second logic circuit 12 that applies the DSA to the output signal in order to generate data for a signature. Both logic circuits 21 and 22 and the changeover switch 24 form a host-controlled cryptologic module 20 which has a control data input c and is connected at its output d with the information output i of the PSD 10.

The usable algorithms specified in the IBI program of the American postal authority USPS are RSA (Rivest, Shamir, Adleman), DSA (Digital Signal Algorithm), and ECDSA (Elliptic Curve Digital Signature Algorithm), which are respectively limited with the SHA-1 (Secure Hash Algorithm).

If a signing key sk of a postal security device (PSD) is applied to a communication m for a first purpose, for example to account for an ordinary indicium (49 bytes), the calculation of the signature sig for the communication m ensues as follows:

$$sig = DSAsign(sk, SHA\text{-}1(m)) \tag{1}$$

For a second purpose, the second communication M is specified. In contrast to the equation (1) used for the first purpose, the signature SIG for a second purpose, for example for a refund indicium, is calculated as follows:

$$SIG = DSAsign(sk, SHA\text{-}1(SHA\text{-}1(M))), \tag{2}$$

By the double application of SHA-1 instead of a single application of SHA-1, it can be prevented that a signature calculated for the second purpose is output for the first purpose. A security examination shows that in this manner, a tamperer achieves as a by-product of an ordinary signature $$m' = SHA\text{-}1(M), \tag{3}$$

which is not helpful for reuse, because the data set of this communication has a length of 160 bits=20 bytes, and to "reuse" a signature, a communication would have to have a data set with a length of 49 bytes. In practice, the knowledge of any 49-byte long data set is not sufficient for a fraudulent manipulation. For deception to work, the deceiver for the most part would have to already be able to select the data set.

Figure 3:
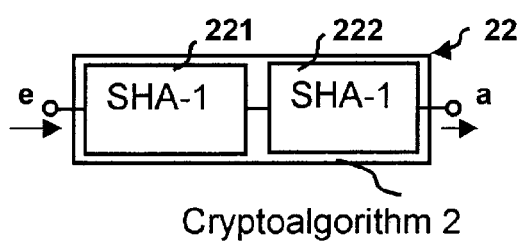
FIGS. 3 and 4 illustrate of the structures of cryptoalgorithms suitable for use in the inventive method and arrangement.
Figure 4:
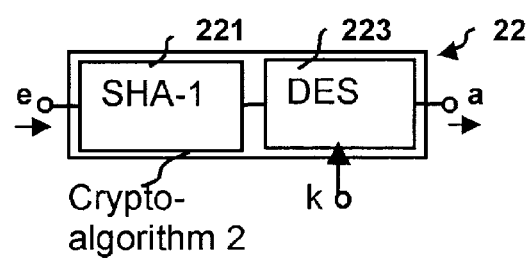

FIG. 3 shows a combination of identical cryptoalgorithms 221 and 222 within the logic circuit 22. The logic circuit 22 is differentiated from the logic circuit 21 by the application of another cryptoalgorithm or via the doubled application of the same cryptoalgorithm.

Figure 5A:
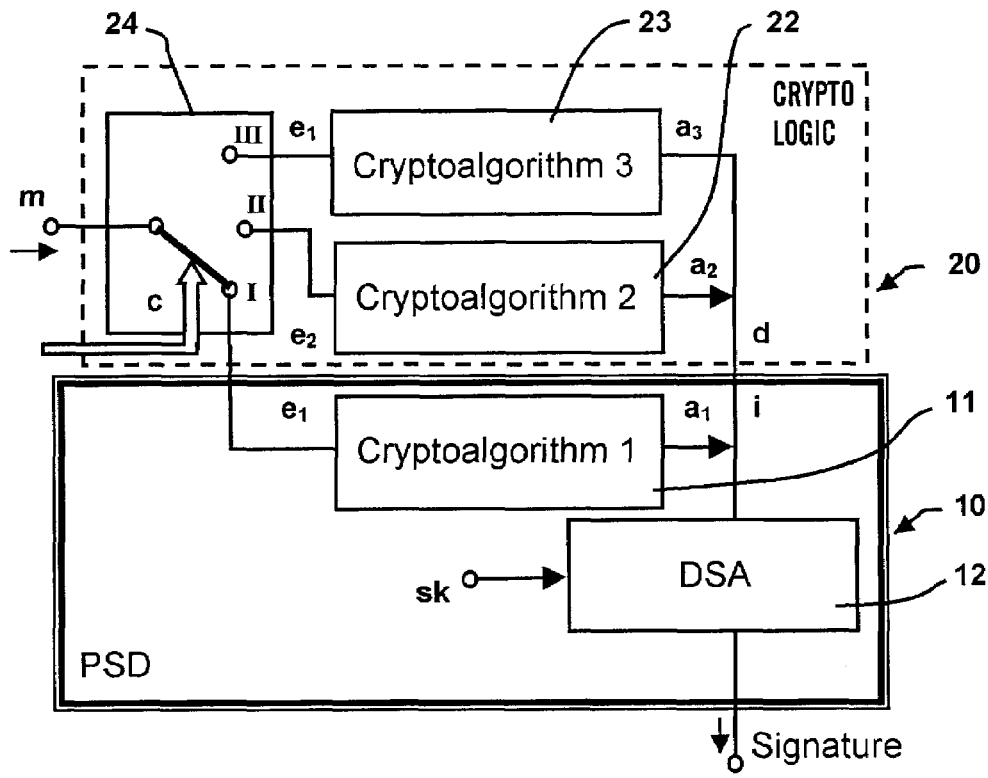
FIG. 5a shows a second version of a host-controlled switch for the cryptoalgorithms for generation of a signature by a postal security device in accordance with the invention.

There are a number of other possible combinations to form a cryptoalgorithm. FIG. 3 shows simple structures of such cryptoalgorithms, wherein the logic circuit 22 is differentiated from the logic circuit 21 by the additional application of a further cryptoalgorithm. It is known to form an HMAC that is based on a known hash function SHA-1. In addition to the communication m, an H-MAC requires a key k as an input. The logic circuit 22 is differentiated from the logic circuit 21 by the additional application of another cryptoalgorithm or by the application of different keys in an identical cryptoalgorithm. Two publicly known parameters can be agreed upon as keys, for example 1010 for ordinary indicia and 0101 for refund indicia. The parameters must be publicly known because the latter is likewise required by the receiver of the indicia for verification. In this variant, the problem does not ensue that was illustrated for refund indicia in the above-identified case of operation in the above security examination, because a refund indicium is formed with the same signing key, but with a different combination of signing and hash algorithms, as an ordinary indicium. Moreover, a refund can be effected directly with the producer infrastructure via an online transaction, in a manner analogous to credit downloading. To authenticate the corresponding communication of the PSD, a different signing key is used than for ordinary indicia. In this manner, the existing signatures never can be misused for indicia purposes A second version of a host-controlled switch for the cryptoalgorithms for a generation of a signature by a postal security device is shown in FIG. 5a. An ordinary postal security device PSD 10 is thereby connected with a cryptologic module 20, and thus its functionality is expanded such that signatures can be formed that are appropriate for three different purposes. The ordinary PSD 10 again has two logic circuits 11 and 12, which can be a software or a hardware module. The cryptologic module 20 provides a host-controlled input-side changeover switch 24 for the communication m. The contacts I, II and III of the changeover switch 24 respectively connect to the inputs e1, e2, e3 of the logic circuits 11, 22, 23. The logic circuits 22 and 23 are arranged in the cryptologic module 20. The cryptologic module 20 has on the output side a connection to the outputs a2, a3 of the logic circuits 22 and 23 and a connection of the output d of the information input i of the PSD 10. The output a1 of the logic circuit 11 is likewise connected with the information input i of the PSD 10. The information input i of the PSD 10 is connected on the input side with the second logic circuit 12, which applies a further algorithm, for example a DSA, to the output signal in order to generate data for a signature.

Figure 5B:
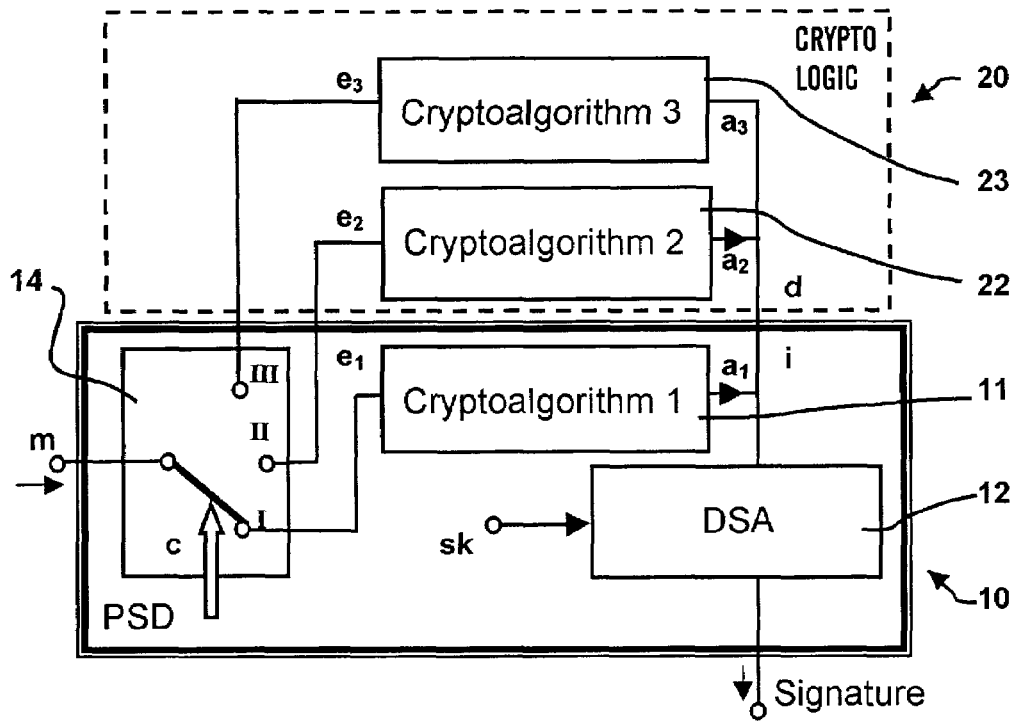
FIG. 5b shows a first version of a PSD-controlled switch for the cryptoalgorithms for generation of a signature by a postal security device in accordance with the invention.

FIG. 5b shows a PSD-controlled switch for the cryptoalgorithms for generation of a signature by a postal security device according in a first version. The PSD has an internal logic circuit 11 for a first cryptoalgorithm and a second logic circuit 12 in order to generate data for a signature. The cryptologic module 20 includes logic circuits for a second cryptoalgorithm 22 and a third cryptoalgorithm 23, and requires no input-side changeover switch. Therefore, a PSD-controlled input-side changeover switch 14 is provided in the PSD 10 for the communication m. The contacts I, II and III of the changeover switch 14 and respectively connected to the inputs e1, e2, e3 of the logic circuits 11, 22, 23. The logic circuits 22 and 23 are arranged in the cryptologic module 20 and respective inputs e2 and e3 are provided, The cryptologic module 20 has on the output side a connection d to the outputs a2, a3 of the logic circuits 22 and 23 with the information input i of the PSD 10.

Figure 6:
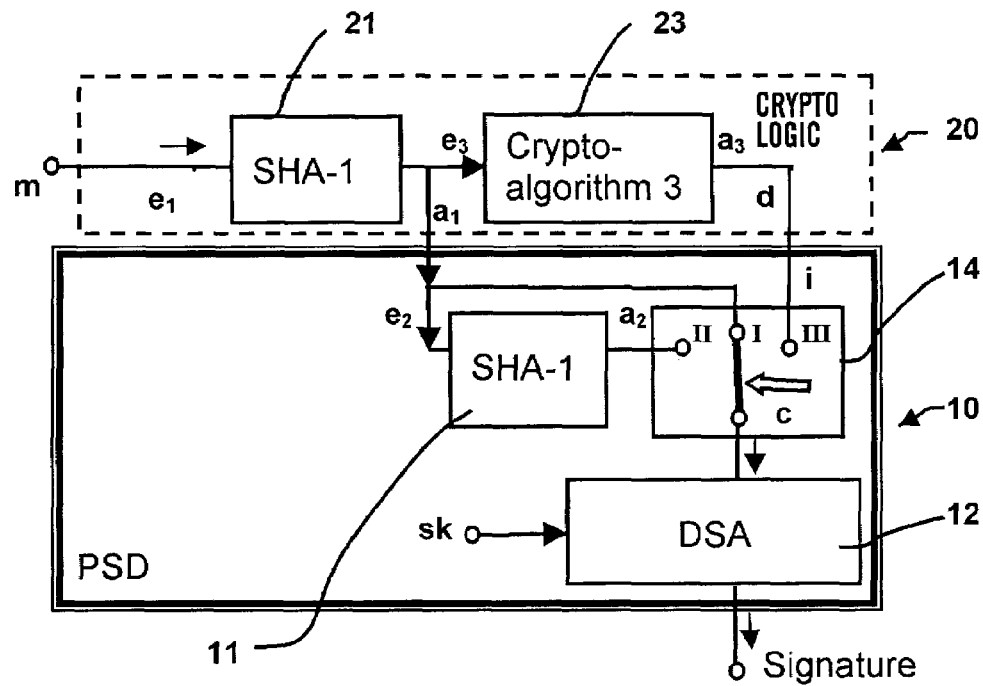
FIG. 6 shows a second version of a PSD-controlled switch for the cryptoalgorithms for a generation of a signal by a postal security device in accordance with the invention.

FIG. 6 shows a second variation of a PSD-controlled switch of the cryptoalgorithms for a generation of a signature by a postal security device. No input-side changeover switch is provided for the communication m, but rather the latter connects to the input $e_1$ of a first logic circuit 21 for a first cryptoalgorithm. Its output $a_1$ is connected to the first contact I of a changeover switch 14 within the PSD 10. The output $a_1$ is connected to the input $e_2$ of a first logic circuit 11 inside the PSD 10. Its output $a_2$ is connected to the second contact 11 of the changeover switch 14 within the PSD 10. Each of the first logic circuits 21 and 11 can employ the same cryptoalgorithm and are successively traversed by the communication when the contact 11 of the changeover switch 14 is selected by the PSD 10 via a control data input c. The output $a_1$ of the first logic circuit 21 is connected to the input $e_3$ of a third logic circuit 23 of the cryptologic module 20, which is external of the PSD 20. Its output $a_3$ is connected to the third contact III of the changeover switch 14 within the PSD 10. In this second version of a PSD-controlled switch, the switching between the first logic circuit 21 and the third logic circuit 23, that are both arranged externally of the PSD 10, ensues directly before the traversal of the second logic circuit 12, which is internally arranged in the PSD 10.

Figure 7:
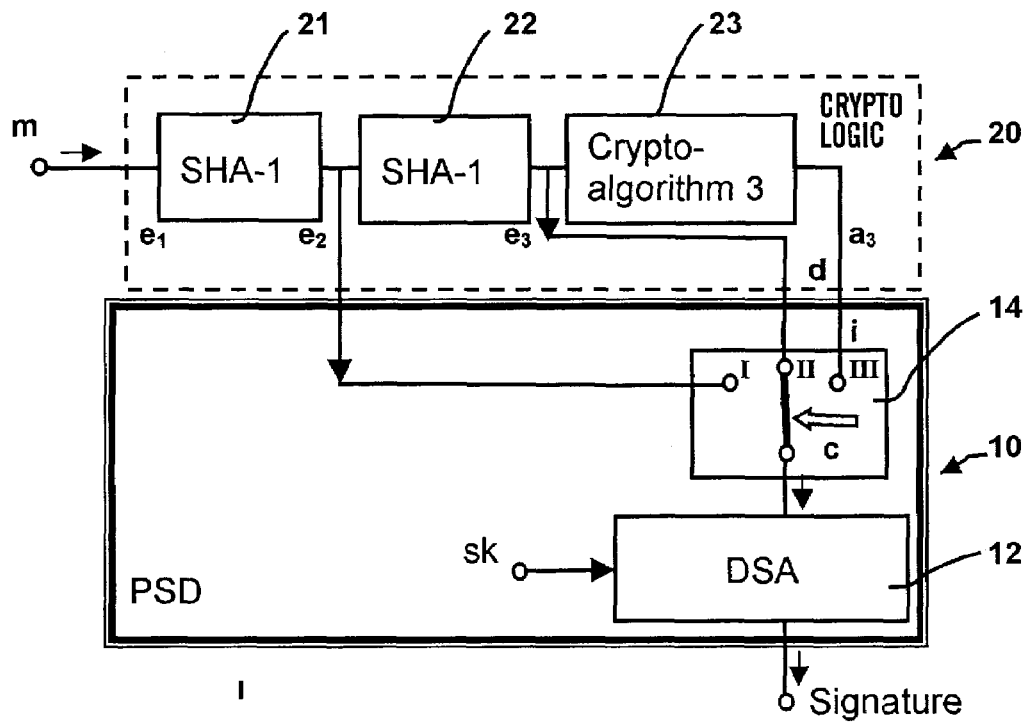
FIG. 7 shows a third version of a PSD-controlled switch for the cryptoalgorithms for generation of a signature by a postal security device in accordance with the invention.

FIG. 7 shows a PSD-controlled switch for the cryptoalgorithms for generation of a signature by a postal security device according to third version. A first logic circuit 21 for a first cryptoalgorithm has an input $e_1$ for a communication m and an output $a_1$ that is connected with an input $e_2$ of a second logic circuit 23 for a second cryptoalgorithm. The output $a_2$ of the second logic circuit 23 is connected with an input $e_3$ of a third logic circuit 23 for a third cryptoalgorithm, the output of which $a_3$ connects to the information input of the postal security device 10. The cryptologic module 20 is connected on the output side with the postal security device 10, and the output $a_1$ of the first logic circuit 21 is connected to a first contact I. The output $a_2$ of the second logic circuit 22 is connected to a second contact II, and the output $a_3$ of the further logic circuit 23 is connected to a third contact III of a PSD-controlled changeover switch 14 inside the postal security device 10. The changeover switch 14 is coupled on the output side to a second logic circuit 12 within the postal security device 10 that generates the signature.

Figure 8:
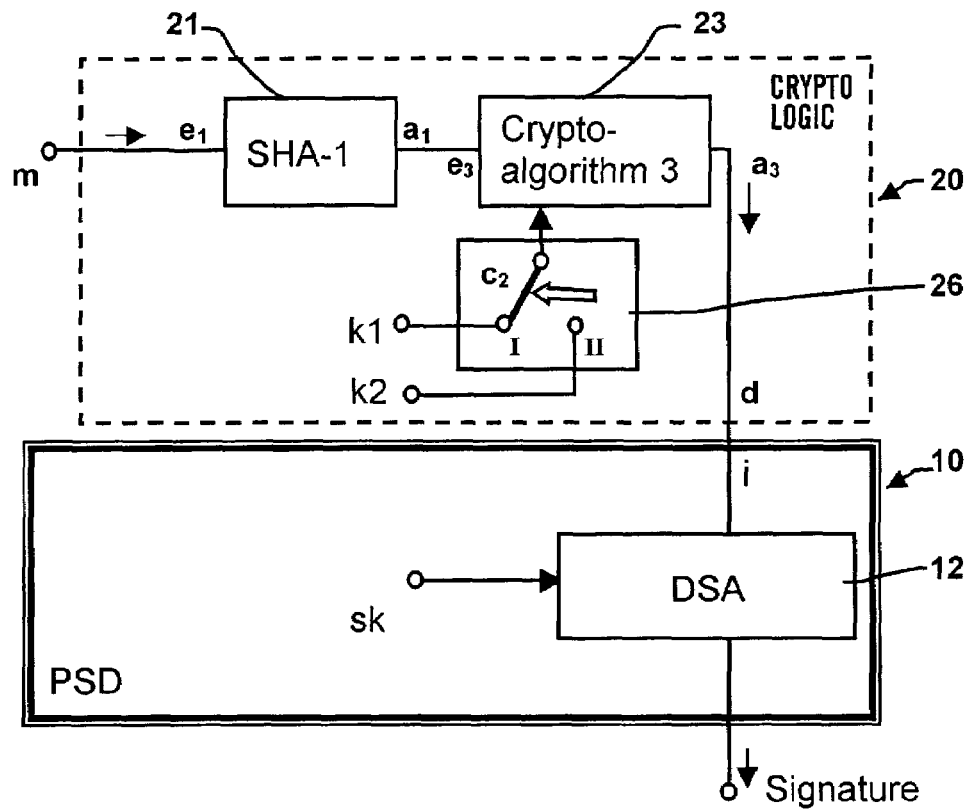
FIG. 8 shows a third version of a host-controlled switch for the cryptoalgorithms for generation of a signature by a postal security device in accordance with the invention.

FIG. 8 shows a third version of a host-controlled switch of the cryptoalgorithms for generation of a signature by a postal security device. A cryptologic module 20 arranged externally of the postal security device 10 is connected with at least with its output d with an information input i of the postal security device 10. The postal security device 10 internally contains a logic circuit 12 that applies a digital signal algorithm to the output signal supplied by output d, in order to generate data for a signature. The cryptologic module 20 includes a number of logic circuits 21, 23 and a changeover switch 26 that has a control data input $c_2$ for control via a host (not shown). The changeover switch 26 is connected with the further logic circuit 23 and switches a key k1, k2 for the further cryptoalgorithm. A first logic circuit 21 for a first cryptoalgorithm has an input $e_1$ for a communication m and an output $a_1$ that is connected with an input $e_3$ for a further logic circuit 23 for a further cryptoalgorithm, the output $a_3$ of which is connected to the information input i of the second logic circuit 12 that generates the signature.

Figure 9:
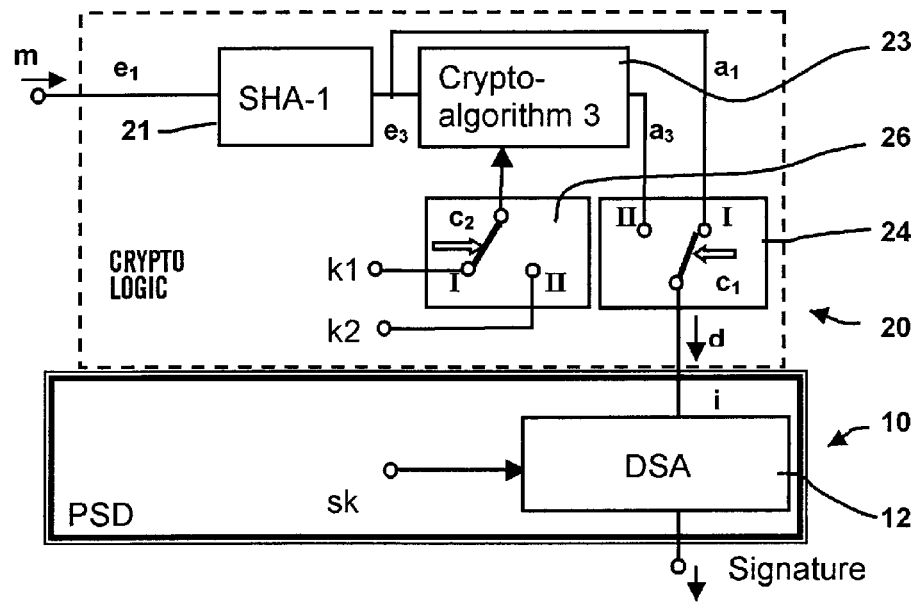
FIG. 9 shows a fourth version of a host-controlled switch for the cryptoalgorithms for a generation of a signature by a postal security device in accordance with the invention.

FIG. 9 shows a fourth version of a host-controlled switch for the cryptoalgorithms for generation of a signature by a postal security device. In addition to the switching of the third version, that has a first changeover switch 26 that switches a key k1, k2 for the further cryptoalgorithm of the further logic circuit 23, a second changeover switch 24 is provided in the host-controlled cryptologic module 20. Contacts I and II of the changeover switch 24 are connected with the outputs $a_1$ and $a_3$ of the first and third logic circuits 21 and 23. The changeover switch 24 forms on the output side the output d that is connected with the information input i of the postal security device 10. The changeover switches 24 and 26 are controlled by a host (not shown) via a control data input $c_1$, $c_2$.

Figure 10:
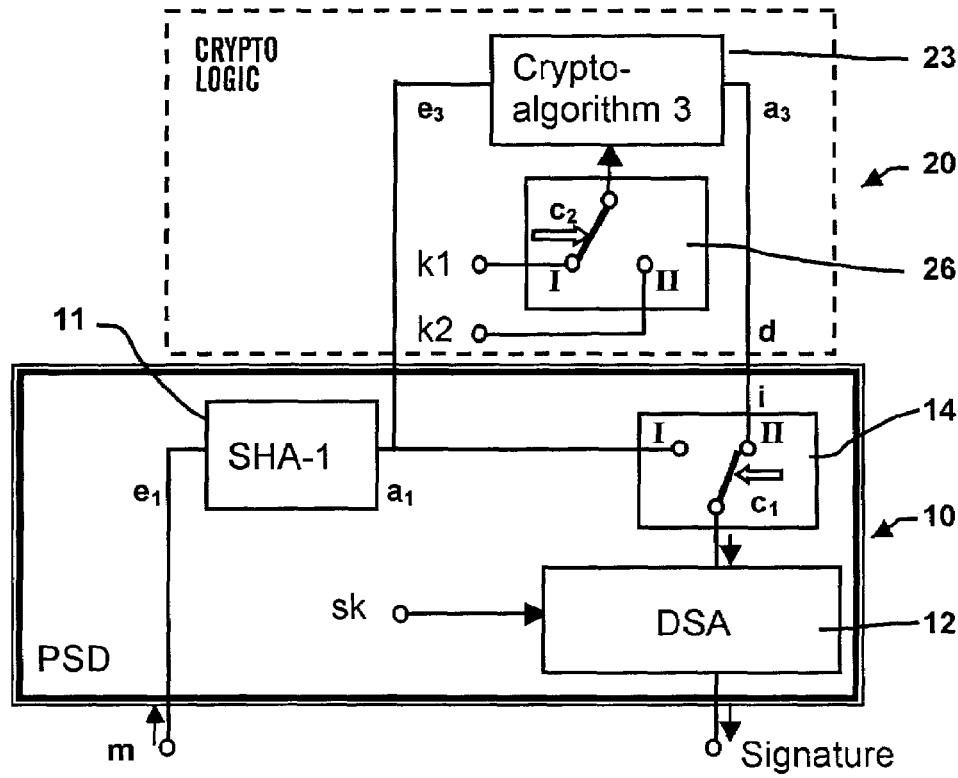
FIG. 10 shows a host and PSD-controlled switch for the cryptoalgorithms for a generation of a signature by a postal security device in accordance with the invention.

FIG. 10 shows a host- and PSD-controlled switching for the cryptoalgorithms for generation of a signature by a postal security device. The postal security device 10 comprises at least one logic circuit 11, and the cryptologic module 20 has at least one logic circuit 23. The cryptologic module 20 has a first host-controlled changeover switch 26 that switches a key k1, k2 for the further cryptoalgorithm of the further logic circuit 23. To switch between the outputs $a_1$ and $a_3$ of the first and third logic circuits 11 and 23, a second PSD-controlled changeover switch 14 is provided in the postal security device 10. Contacts I and II of the changeover switch 14 are connected with the outputs $a_1$ and $a_3$ of the first or, respectively, third logic circuits 11 and 23, respectively.

Figure 11:
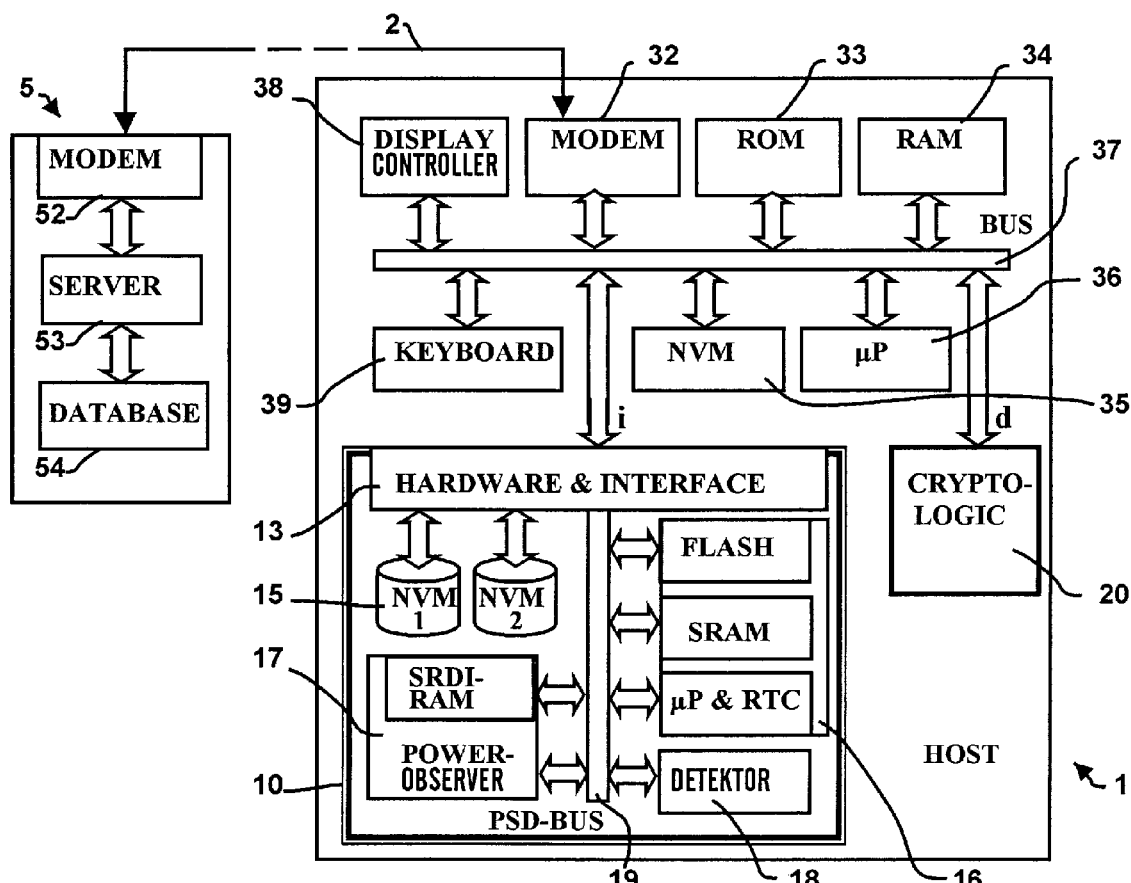
FIG. 11 is a block diagram of a host device in accordance with the invention.

FIG. 11 shows a block diagram of a host device. The postal security device 10 and the cryptologic module 20 are connected under normal operating conditions by means of interfaces i, d via a host-internal BUS 37. A hardware and interface switch 13 of the postal security device 10 for the interface i can be realized, for example, with an application-specific switch (ASIC). The latter is connected with a data processing unit 16 for implementation of the aforementioned cryptographic functions and with non-volatile storage 15 for implementation of further functions. The data processing unit 16 has a microprocessor (µP) with real-time clock (RTC), FLASH storage, and main memory (SRAM). The security device 10 has internal monitoring units 17 and 19 and an internal bus 19. The host device 1 likewise has a non-volatile storage 35, microprocessor 36, read-only memory 33, main memory 34, as well as a modem 32, keyboard 39, and display controller 38 with display unit (not shown). The host device 1 can be connected via a communication connection 2 with a remote data central 5. The data central 5 has, for example, a modem 52, a server 53, and a databank 54. The host device 1 can—in a manner not shown—be connected via a communication connection or interface with a further device, for example a print device.

The invention of not limited to the described embodiments, in which at least two different hash functions permitted by an authority are used in the same signing algorithm. Alternatively, the same hash function can be used in two different permitted signing algorithms. The cryptologic module 20 is then likewise connected with the PSD 10. The various permitted signing algorithms and their switching are undertaken according to software. The cryptologic module 20 comprises only a logic circuit 21 for a cryptoalgorithm, for example a known hash function.

Although modifications and changes may be suggested by those skilled in the art, it is the intention of the inventor to embody within the patent warranted hereon all changes and modifications as reasonably and properly come within the scope of his contribution to the art.

I claim as my invention:

1. A computed-implemented method for variably generating cryptographic securities for communications, involving a host device, comprising the steps of:

cryptographically securing a communication for a first purpose using a first signature;

cryptographically securing a communication for a second purpose using a second signature;

in a processor, using a cryptographic algorithm of a first type to generate said first signature;

using a cryptographic algorithm of a second type in said processor to generate said second signature, said cryptographic algorithms of said first type and said second type, for a same input set, respectively generating different respective outputs from said processor;

entering an input set into said processor for a current communication together with an entry designating whether said current communication is for said first purpose or for said second purpose;

when said current communication is designated for said first purpose, operating on said input set in said processor for said current communication with said cryptographic algorithm of said first type to secure said current communication with said first signature and emitting said current communication secured with said first signature as a secured communication output from said processor;

when said current communication is designated for said second purpose, operating on the same input set in said processor for said current communication with said cryptographic algorithm of said second type to secure said current communication with said second signature and emitting said current communication secured with said second signature as a secured communication output from said processor;

in a memory of a postal security device, storing a first program that, when executed, implements said cryptographic algorithm of said first type and providing storing a second program that, when executed, implements said cryptographic algorithm of said second type;

employing a hardware unit, outside of and in communication with said postal security device, as said processor;

when said current communication is designated for said first purpose, accessing said memory of said postal security device, from said hardware unit and executing said first program in said hardware unit to secure said communication for said first purpose with a first signature produced by said cryptographic algorithm of said first type; and when said current communication is designated for said second purpose, accessing said second program said memory of said postal security device from said hardware unit and, in said hardware unit, executing said second program to secure said second communication for said second purpose with a signature generated by said cryptographic algorithm of said second type.

2. A computed-implemented method for variably generating cryptographic securities for communications, involving a host device, comprising the steps of:

cryptographically securing a communication for a first purpose using a first signature;

cryptographically securing a communication for a second purpose using a second signature;

in a processor, using a cryptographic algorithm of a first type to generate said first signature;

using a cryptographic algorithm of a second type in said processor to generate said second signature, said cryptographic algorithms of said first type and said second type, for a same input set, respectively generating different respective outputs from said processor;

entering an input set into said processor for a current communication together with an entry designating whether said current communication is for said first purpose or for said second purpose;

when said current communication is designated for said first purpose, operating on said input set in said processor for said current communication with said cryptographic algorithm of said first type to secure said current communication with said first signature and emitting said current communication secured with said first signature as a secured communication output from said processor;

when said current communication is designated for said second purpose, operating on the same input set in said processor for said current communication with said cryptographic algorithm of said second type to secure said current communication with said second signature and emitting said current communication secured with said second signature as a secured communication output from said processor;

generating said first signature exclusively in a first logic circuit module that executes said cryptographic algorithm of said first type therein under control of a first implementation program; and generating said second signature exclusively in a second logic circuit module by executing said cryptographic algorithm of said second type therein under control of a second implementation program;

storing said first and second implementation programs in a postal security device accessible by each of said first and second logic circuit modules;

accessing said first implementation program in said postal security device from said first logic circuit module when said current communication is designated for said first purpose; and accessing said implementation program in said postal security device from said second logic circuit module when said current communication is designated for said second purpose.

3. A computed-implemented method for variably generating cryptographic securities for communications, involving a host device containing a postal security device, comprising the steps of:

cryptographically securing a communication for a first purpose using a first signature;

cryptographically securing a communication for a second purpose using a second signature;

in a processor, using a cryptographic algorithm of a first type to generate said first signature;

using a cryptographic algorithm of a second type in said processor to generate said second signature, said cryptographic algorithms of said first type and said second type, for a same input set, respectively generating different respective outputs from said processor;

entering an input set into said processor for a current communication together with an entry designating whether said current communication is for said first purpose or for said second purpose;

when said current communication is designated for said first purpose, operating on said input set in said processor for said current communication with said cryptographic algorithm of said first type to secure said current communication with said first signature and emitting said current communication secured with said first signature as a secured communication output from said processor;

when said current communication is designated for said second purpose, operating on the same input set in said processor for said current communication with said cryptographic algorithm of said second type to secure said current communication with said second signature and emitting said current communication secured with said second signature as a secured communication output from said processor;

generating said first signature exclusively in a first logic circuit module that executes said cryptographic algorithm of said first type therein under control of a first implementation program; and generating said second signature exclusively in a second logic circuit module by executing said cryptographic algorithm of said second type therein under control of a second implementation program;

storing said first implementation program in a memory of said host device outside of said postal security device; and storing said second implementation program in said memory of said host device outside of said postal security device;

accessing said first implementation program in said memory from said first logic circuit module when said current communication is for said first purpose; and accessing said second implementation program in said memory from said second logic circuit module when said current communication is for said second purpose.

4. A computed-implemented method for variably generating cryptographic securities for communications, involving a host device, comprising the steps of:

cryptographically securing a communication for a first purpose using a first signature;

cryptographically securing a communication for a second purpose using a second signature;

in a processor, using a cryptographic algorithm of a first type to generate said first signature;

using a cryptographic algorithm of a second type in said processor to generate said second signature, said cryptographic algorithms of said first type and said second type, for a same input set, respectively generating different respective outputs from said processor;

entering an input set into said processor for a current communication together with an entry designating whether said current communication is for said first purpose or for said second purpose;

when said current communication is designated for said first purpose, operating on said input set in said processor for said current communication with said cryptographic algorithm of said first type to secure said current communication with said first signature and emitting said current communication secured with said first signature as a secured communication output from said processor;

when said current communication is designated for said second purpose, operating on the same input set in said processor for said current communication with said cryptographic algorithm of said second type to secure said current communication with said second signature and emitting said current communication secured with said second signature as a secured communication output from said processor;

storing a plurality of algorithms selected from the group consisting of signing algorithms and hash algorithms in a read-only memory of a postal security device;

from a logic circuit module outside of said postal security device having access to said memory, accessing a selected one of said algorithms when said current communication is designated for said first purpose and using said selected one of said algorithms as said cryptographic algorithm of said first type in said logic circuit module to secure said communication for said first purpose; and from said logic circuit module, accessing a selected different one of said algorithms from said read-only memory of said postal security device and, when said current communication is designated for said second purpose, securing said communication for said second purpose in said logic circuit module using said selected different one of said algorithm as said cryptographic algorithm of said second type.

* * * * *